United States Patent [19]

Lawson et al.

[11] Patent Number: 4,461,848

[45] Date of Patent: Jul. 24, 1984

[54] PRODUCTION OF VESICULATED POLYMER BEADS

[75] Inventors: Edmund J. Lawson; Charles G. Waterfield, both of Cleveland, England

[73] Assignee: Tioxide Group Plc., Stockton-on-Tees, England

[21] Appl. No.: 437,797

[22] Filed: Oct. 29, 1982

[30] Foreign Application Priority Data

Nov. 20, 1981 [GB] United Kingdom ............... 8135114

[51] Int. Cl.$^3$ .............................................. C08G 53/08
[52] U.S. Cl. ...................................... 521/64; 521/63; 521/138; 521/56; 523/337; 523/502
[58] Field of Search .......................... 521/63, 64, 138

[56] References Cited

U.S. PATENT DOCUMENTS

| | | | |
|---|---|---|---|
| 3,255,127 | 6/1966 | Von Bonin et al. | 521/62 |
| 3,822,224 | 7/1974 | Gillan et al. | 521/63 |

FOREIGN PATENT DOCUMENTS

| | | |
|---|---|---|
| 1167979 | 10/1969 | United Kingdom . |
| 1288583 | 9/1972 | United Kingdom . |
| 1332469 | 10/1973 | United Kingdom . |
| 1450073 | 9/1976 | United Kingdom . |
| 1476510 | 6/1977 | United Kingdom . |
| 1548294 | 7/1979 | United Kingdom . |

*Primary Examiner*—Morton Foelak
*Attorney, Agent, or Firm*—Banner, Birch, McKie & Beckett

[57] ABSTRACT

An improved process for the manufacture of vesiculated beads has been developed which can be used for the production of semi-gloss or satin finished paints. The process involves mixing an oil-phase containing a cross-linkable polyester resin in solution with a monomer co-polymerizable with the resin and an aqueous phase containing an emulsifying agent under conditions such that globules of the oil-phase are formed having a diameter of less than 1.5 microns. The emulsion containing the globules also contains a base and the amount of the emulsifying agent is from 3 to 16 grams per 100 ml of the oil-phase and the volume fraction has a value of 0.2 to 0.4 and X as defined is from 4 to 8. Preferably the beads are pigmented with titanium dioxide pigment.

14 Claims, No Drawings

PRODUCTION OF VESICULATED POLYMER BEADS

This invention relates to the production of polymeric forms and particularly to the production of vesiculated polymer beads.

Known processes for the manufacture of vesiculated polymer beads produce products which are useful in the manufacture of matt paints. There is a need for an improved process for the manufacture of vesiculated beads which can be used in the production of semi-gloss or satin finish paints and which beads also have a sufficient degree of vesiculation to render the paint acceptably opaque.

According to the present invention a process for the manufacture of vesiculated polymer beads comprises mixing:

an oil phase (A) comprising a cross-linkable water-insoluble carboxyl containing polyester resin in solution with a monomer copolymerisable with said resin and an aqueous phase (B) comprising an emulsifying agent in aqueous solution, to form an emulsion of (A) in (B) in which the majority of the globules of (A) so formed have a diameter of less than 1.5 microns and containing a base and polymerising the resin of the globules to form the desired vesiculated beads in which process the amount of the emulsifying agent is from 3 to 16 grams per 100 ml of (A), the total amount of the base is from 0.3 to 10 equivalents per carboxyl group of the resin the volume fraction $$(R) = \frac{\text{vol of } (A)}{\text{vol of } (A + B)}$$

has a value of 0.2 to 0.4 and the value of X in the relationship $$\frac{R(\text{amount of emulsifying agent})}{(1 - 2R)} = X$$

is from 4 to 8.

By the term vesiculated it will be understood to mean that the beads contain a plurality of vesicles.

The process of this invention produces vesiculated beads usually having a mean volume diameter of less than 1 micron and with 95% of the volume of beads usually having a diameter less than 1.5 microns. The beads are well vesiculated at these small sizes and can be used to produce satin or semi-gloss finish paints. Beads having mean volume diameter of say 0.5 to 1 micron may be obtained in the process of the invention and if desired may be pigmented.

It will be seen that the process involves the application of critical parameters to the amounts of various reagents and their interrelationship and these will be discussed in more detail later in this specification.

Generally the polyester resin used in the present invention will be unsaturated and may be any such resin which is capable of reaction with an unsaturated organic monomer at temperatures below about 100° C. to form a rigid cross-linked polymer having suitable physical and chemical properties for bead formation. It is preferred, in the process of the present invention, to use resins formed by the condensation of a dihydric alcohol (or its corresponding oxide) with a proportion of an aliphatic dicarboxylic acid and with a proportion of an aromatic dicarboxylic acid (or the corresponding anhydrides).

Unsaturated polyester resins formed from the condensation of ethylene, propylene, tetra-, penta- or hexamethylene glycols, or their corresponding oxides, with unsaturated dibasic acids such as fumaric or maleic (or the anhydride in the latter case) and with a proportion of an aromatic acid such as isophthalic or phthalic and (or phthalic anhydride) have been found to be particularly suitable for the present process. The condensation product of propylene glycol; fumaric acid or maleic anhydride and phthalic acid (or the anhydride) is particularly suitable.

It is generally desirable that the proportions of components and the degree of condensation be such that the resulting unsaturated polyester resin has an acid value in the range 5 to 100 (expressed as mgms KOH per gram of resin) and particularly one in the range 10 to 35.

It has also been found advantageous to utilise unsaturated polyester resins having a viscosity in the range 5 to 60 and particularly a viscosity in the range 20 to 40 poise, (when measured as a 70% by weight solution in the unsaturated monomer, e.g. styrene, at 25° C.).

It may also be of advantage to modify the unsaturated polyester resin by the incorporation into the resin of polyethylene oxide chains since such resins may also form stable emulsions of the type required by the present invention.

In the process of this invention the polyester resin is initially dissolved in the unsaturated monomer, the latter being present in sufficient quantity to provide the necessary crosslinking of the resin component. The amount of monomer present is normally at least 30% by weight on the resin and is preferably present in an amount in the range 40% to 70%.

The unsaturated monomer in which the resin is dissolved will be substantially insoluble in water and as indicated is capable of copolymerising with the resin to produce a cross-linked product. Generally the unsaturated monomer is an unsaturated aromatic hydrocarbon and preferably is a vinyl aromatic hydrocarbon such as styrene, divinyl benzene, alpha-methyl styrene or the mixed monomers available commercially as vinyl toluene. If desired an unsaturated aliphatic co-monomer can be mixed with the unsaturated monomer and typical co-monomers are the esters of acrylic or methacrylic acids such as methyl acrylate, methyl methacrylate, ethyl acrylate and n-butyl acrylate and other polymerisable compounds such as acrylonitrile, vinyl acetate and ethylene glycol dimethacrylate.

The aqueous phase (B) which is prepared comprises an emulsifying agent in aqueous solution. The emulsifying agent has the function of stabilising oil-in-water type emulsions and an example of such an emulsifying agent is a phenol modified polyalkylene oxide but preferably the emulsifying agent is a partially hydrolysed polyvinylacetate. A typically useful partially hydrolysed polyvinylacetate will have a molecular weight of up to 150,000, say 100,000 and have 85% to 95% of its hydrolysable groups hydrolysed.

The aqueous phase preferably also contains a base which must be capable of at least partially ionising the carboxyl groups of the resin to assist in stabilising the globules of the resin and to assist in developing the internal vesiculation of the beads. Generally any suitable organic or inorganic base may be used but in practice the preferred base is inorganic and in particular is an alkali, such as ammonia or an alkaline salt thereof such as ammonium carbonate or an alkali metal carbonate.

Although it is preferred that the aqueous phase contains a base this need not necessarily be so. The base can be added to the emulsion after formation or a part of the total quantity of the base can be present in the aqueous phase and part added either during or after formation of the emulsion. In the most preferred process part of the base is present in the aqueous phase (B) and part of the base is added to the emulsion during stirring to form the emulsion.

The actual concentration of the emulsifying agent depends on the required amount necessary for the purposes of this invention and on the amount of water that it is thought desirable to use and in general on the volume ratio between the oil phase (A) and the aqueous phase (B). Usually however the actual concentration of emulsifying agent in the aqueous phase is from 0.7 percent to 11 percent by weight on total weight of phase (B). However the amount of emulsifying agent used in the process must be 3 to 16 grams per 100 ml of (A) and preferably from 5 to 12 grams per 100 ml. of (A).

The concentration of the base in the phase (B) also similarly depends on a number of factors but essentially the total amount employed in the process of the invention is 0.3 to 10 equivalents of base per carboxyl group of the resin present in phase (A). Preferably the amount of the base is from 1 to 4 equivalents per carboxyl group of the resin. Thus it will be appreciated that the actual concentration of the base in the aqueous phase (B) should be such as to provide the total required amount within the range set out herein when added to any further amount added during or after mixing of (A) and (B).

The aqueous phase may also include a thickener to assist in the formation of the emulsion in the process of the invention and a typical thickener is hydroxyethyl cellulose. The amount of the thickener present may be from 0 to 0.6 grams per 100 ml. of aqueous phase (B).

It is usual to incorporate a pigment such as titanium dioxide, iron oxide or magnesium titanate, or an organic pigment in the beads and this may be achieved by milling the pigment with phase (A) before the two phases (A) and (B) are mixed in accordance with the invention. The pigment is milled with the oil phase (A) usually in an amount (depending on the particular pigment) such as to introduce into the finished beads up to 60% by weight of the total weight of the beads.

Any suitable type of titanium dioxide pigment may be employed in the process of the invention but preferably the titanium dioxide is pigmentary rutile titanium dioxide which may carry a "so-called" coating of one or more hydrous oxides of metal such as titanium, aluminium, zirconium, zinc, cerium, or of silica or a phosphate.

In accordance with the invention the two phases (A) and (B) are mixed in a specified volume fraction R given by the expression $$(R) = \frac{\text{vol of }(A)}{\text{vol of }(A + B)}$$

and which value is 0.2 to 0.4. Most preferred is a process wherein the phases (A) and (B) are mixed in the proportions such that the volume fraction (R) given by the aforementioned expression has a value of 0.25 to 0.35.

Further the process of the invention is carried out so that $$\frac{R(\text{amount of emulsifying agent})}{(1 - 2R)} = X$$

when the amount of the emulsifying agent has a value of 3 to 16 grams per 100 ml of (A) and wherein R had a value of 0.2 to 0.4 the value of X should be 4 to 8.

Mixing of the two phases (A) and (B) is effected until the majority of globules of (A) formed have a size less than 1.5 microns and usually this means that about 95 percent by volume of the globules have a size less than 1.5 microns in diameter. Mixing is usually carried out in a high speed mixer suitable for the formation of emulsions and it has been observed that as the stirrer speed is increased a lower value of X within the above range may be used. A most useful mixer is a rotor-stator mixer.

After formation of the beads the resin is cross-linked by copolymerising the chosen monomer with the resin. Initiation of polymerisation is usually effected chemically by the addition to the emulsion of a suitable initiator such as an organic peroxide, e.g. cumene hydroperoxide. If desired, and usually, the polymerisation is effected in the presence of an accelerator such as cobalt naphthenate which can conveniently be added to the oil phase (A) prior to mixing with the aqueous phase (B).

Polymerisation is usually effected at an elevated temperature of greater than 40° C. and usually temperatures within the range 50° C. to 65° C. will be employed. For maximum polymerisation and cross-linking it is desirable that the suspension of beads be aged. Desirably the amount of free monomer in the suspension of the beads after completion of the process should be below 1% by weight of the suspension and preferably below 0.3% by weight.

The beads obtained may be separated from the aqueous suspension prior to use, but preferably are retained in the aqueous suspension and mixed with appropriate ingredients to form aqueous emulsion paints which have a satin or semi-gloss appearance with good opacity.

EXAMPLE 1

An unsaturated polyester resin was prepared by condensation polymerisation of maleic acid, phthalic anhydride, and propylene glycol in the molar proportion of 3:1:4.5. The product had an acid value of 22 mg KOH per g and a viscosity of 25 poise as a 70% w/w solution in styrene at 250° C.

An oil phase was prepared by milling 100 parts of rutile titanium dioxide in 54 parts of a 50% solution of the unsaturated polyester in styrene. A further 63 parts of the 50% resin solution were then added, followed by 0.56 parts of a solution of cobalt naphthenate in styrene containing 6% w/w cobalt.

83 parts by weight of the resulting dispersion were added, while stirring, to an aqueous phase consisting of 5.9 parts of 90% hydrolysed polyvinyl acetate, 0.3 parts of hydroxy ethyl cellulose, 1.53 parts of a 30% w/w solution of ammonia and 137 parts of water, giving a volume fraction (R) of the non-aqueous phase of 0.26 and a value of X of 6.3.

The resulting emulsion was stirred at high speed on a rotor-stator mixer for 5 minutes, after which time the droplets were substantially less than 1.5 microns in diameter.

Then were added 100 parts hot water to give a temperature in the total mixture of 50° C. and 0.72 parts cumene hydroperoxide to initiate polymerisation. The mixture was allowed to stand overnight to produce a suspension of vesiculated beads.

The resulting beads were shown by electron microscopy to be well vesiculated and to have a mean volume diameter of 0.73 micron with 95% volume less than 1.5 micron.

A paint was prepared from the bead dispersion as follows. An additional amount of the rutile pigment (50 parts) was milled into the bead slurry (125 parts), together with a polyphosphate dispersant (0.3 parts), an antifoaming agent (Nopco NXZ) (0.1 parts) and a biocide (Proxel PL) (0.3 parts).

A let-down solution consisting of 10 parts hydroxyethyl cellulose, 10 parts of a 5% solution of polyphosphate dispersant (Calgon PT), 58 parts ester-alcohol coalescing aid (Texanol), 6 parts of the antifoaming agent, 1 part of the biocide and 695 parts water was prepared. To this were added, 1707 parts of a vinyl copolymer latex dispersion at 55% non-volatile content (Emultex VV 536). The pH of the let-down solution was adjusted to 8 with aqueous ammonia solution.

To 40 parts of the let-down solution were added 35 parts of the mixed pigment/bead dispersion. The resulting paint was drawn down on black and white card at a wet thickness of 60 microns and allowed to dry overnight. The dry film gave a contrast ratio of 88.4% and gloss values of 30 (60°) and 83 (85°) measured on a Byk Mallinckrodt glossmeter.

EXAMPLE 2

Rutile titanium dioxide pigment was dispersed in polyester resin solution and cobalt naphthenate added as in Example 1.

141 parts by weight of the dispersion so obtained were added, while stirring, to an aqueous phase consisting of 7.5 parts of 90% hydrolysed polyvinyl acetate, 0.5 part hydroxy ethyl cellulose, 0.8 part of a 30% w/w solution of ammonia and 216 parts of water at approx 40° C., giving a volume fraction (R) of the non-aqueous phase of 0.28 (X=5.4).

The emulsion was stirred at high speed for 2 minutes, then a further 1.8 parts 30% ammonia were added and stirring continued for 5 minutes.

Then were added 194 parts hot water, to give an overall temperature of 54° C., and 1 part cumene hydroperoxide.

After cure vesiculated beads were obtained with mean volume diameter, measured using an electron microscope, of 0.80 micron, with 95% vol. less than 1.4 micron.

A test paint was prepared as in Example 1 and drawn down to give contrast ratio 93.4% and gloss values of 24 (60°) and 74/85°).

EXAMPLES 3, 4 AND 5

These Examples show the effect of varying the volume fraction at emulsification.

Rutile titanium dioxide pigment was dispersed in a 50% unsaturated-polyester-resin solution by ball-milling 100 parts of $TiO_2$ with 117 parts resin solution. Into 143 parts of the dispersion were mixed 3 parts of a 50% w/w paste of benzoyl peroxide in butyl benzyl phthalate. The mixture was added to an aqueous phase consisting of 10.2 parts 90% hydrolysed polyvinyl acetate, 0.5 part hydroxy ethyl cellulose, 3.5 parts 30% w/w ammonia solution and differing amounts of water as shown in the table below. The emulsion was stirred with a laboratory toothed-disc impeller for 5 minutes at 2000 rpm.

Water at 60° C. was added to dilute the non-aqueous content to 25% w/w and cure was promoted by adding 1 part diethyl aniline. Samples were placed in a waterbath at 60° C. for two hours to ensure equal cure.

Test paints were prepared as follows. A predispersed rutile $TiO_2$ pigment slurry was made at 75% w/w in water with 0.5% w/w polyphosphate dispersant on $TiO_2$. Of this 5 parts were mixed with 38 parts of a vinyl acetate copolymer latex dispersion at 56% non-volatile content, 6.7 parts of a 3% w/w solution of hydroxy ethyl cellulose and 0.3 part 30% w/w ammonia solution. This premix (50 parts) was mixed with 60 parts of the bead slurry.

Size differences between the beads were assessed through gloss measurements on the resulting paints.

| Ex. | Parts water at emulsification | Volume fraction R | X | 85° Gloss |
|---|---|---|---|---|
| 3 | 300 | 0.22 | 4.4 | 52 |
| 4 | 235 | 0.26 | 6.3 | 56 |
| 5 | 190 | 0.30 | 8.8 | Emulsion inverted |

We claim:

1. A process for the manufacture of vesiculated polymer beads which comprises:
   forming an oil phase (A) by dissolving a cross-linkable water-insoluble carboxyl containing polyester resin in a monomer copolymerisable with said resin;
   forming an aqueous phase (B) by dissolving an emulsifying agent in an aqueous solution;
   mixing phases (A) and (B) to form an emulsion of (A) in (B) in which 95% of the golubles of (A) so formed usually have a diameter of less than 1.5 microns, said emulsion also containing a base; and
   polymerising the resin of the golubles to form the desired vesiculated beads in which process the amount of the emulsifying agent is from 3 to 16 grams per 100 ml. of (A), the total amount of the base is from 0.3 to 10 equivalents per carboxyl group of the resin, the volume fraction $$(R) = \frac{\text{vol. of }(A)}{\text{vols. of }(A) + (B)}$$

has a value of 0.2 to 0.4, and the value of X in the relationship $$X = \frac{R(\text{amount of emulsifying agent})}{(1 - 2R)}$$

is from 4 to 8.

2. A process according to claim 1 in which the volume fraction (R) had a value of 0.25 to 0.35.

3. A process according to claim 1 in which the amount of the emulsifying agent is from 5 to 12 grams per 100 ml of (A).

4. A process according to claim 1 in which the total amount of said base is from 1 to 4 equivalents per carboxyl group of the resin.

5. A process according to claim 1 in which the carboxyl containing polyester resin is a condensation product of a dihydric alchol, an aliphatic dicarboxylic acid and an aromatic dicarboxylic acid.

6. A process according to claim 1 in which the monomer is present in the oil-phase (A) in an amount of at least 30% by weight of the resin.

7. A process according to claim 1 in which the monomer is an unsaturated aromatic hydrocarbon.

8. A process according to claim 1 in which the emulsifying agent is a partially hydrolysed polyvinyl-acetate having a molecular weight of up to 150,000 and having from 85% to 95% of its hydrolysable groups hydrolysed.

9. A process according to claim 1 in which at least part of the total amount of said base is present in the aqueous phase (B) prior to mixing with said oil-phase (A).

10. A process according to claim 9 in which a further quantity of said base is added to the emulsion during mixing of said oil-phase (A) and said aqueous phase (B).

11. A process according to claim 9 in which a further quantity of said base is added to the emulsion after mixing of said oil-phase (A) and said aqueous phase (B).

12. A process according to claim 1 in which a pigment is mixed with said oil-phase (A) prior to mixing of phases (A) and (B).

13. A process according to claim 12 in which the amount of said pigment is such as to introduce into said beads up to 60% by weight of the total weight of said beads.

14. A process according to claim 13 in which the pigment is titanium dioxide.

* * * * *